US009013992B2

(12) United States Patent
Perkins (10) Patent No.: US 9,013,992 B2
(45) Date of Patent: Apr. 21, 2015

(54) METHOD AND APPARATUS FOR NETWORK ADDRESS TRANSLATION (75) Inventor: Charles E. Perkins, Saratoga, CA (US)

(73) Assignee: WiChorus, Inc., Santa Clara, CA (US)

( * ) Notice: Subject to any disclaimer, the term of this patent is extended or adjusted under 35 U.S.C. 154(b) by 931 days.

(21) Appl. No.: 13/012,445

(22) Filed: Jan. 24, 2011

(65) Prior Publication Data
US 2011/0182183 A1 Jul. 28, 2011

Related U.S. Application Data (63) Continuation-in-part of application No. 12/877,984, filed on Sep. 8, 2010, now abandoned.

(60) Provisional application No. 61/276,108, filed on Sep. 8, 2009.

(51) Int. Cl.
H04L 12/749 (2013.01)
H04L 29/12 (2006.01)
H04L 29/06 (2006.01)

(52) U.S. Cl.
CPC ...... H04L 61/2514 (2013.01); H04L 29/12066 (2013.01); H04L 29/12367 (2013.01); H04L 29/1249 (2013.01); H04L 61/1511 (2013.01); H04L 61/256 (2013.01); H04L 69/22 (2013.01)

(58) Field of Classification Search
CPC .............. H04L 61/2514; H04L 61/256; H04L 61/1511; H04L 29/12367; H04L 29/1249; H04L 29/12066; H04L 69/22
See application file for complete search history.

(56) References Cited

U.S. PATENT DOCUMENTS

| 7,602,785 | B2 | 10/2009 | Dharmapurikar et al. | |
| 8,130,768 | B1 | 3/2012 | Ahrens et al. | |
| 8,190,763 | B2* | 5/2012 | Savoor et al. | 709/232 |
| 8,239,751 | B1 | 8/2012 | Rochelle et al. | |
| 8,339,959 | B1* | 12/2012 | Moisand et al. | 370/235 |
| 8,363,650 | B2* | 1/2013 | Rao et al. | 370/389 |
| 8,572,717 | B2 | 10/2013 | Narayanaswamy | |
| 8,601,567 | B2* | 12/2013 | Spatscheck et al. | 726/13 |
| 2003/0092442 | A1 | 5/2003 | Dalal et al. | |
| 2003/0236913 | A1 | 12/2003 | Hoban et al. | |
| 2004/0076180 | A1 | 4/2004 | Satapati et al. | |
| 2005/0152298 | A1 | 7/2005 | Thubert et al. | |
| 2006/0259625 | A1 | 11/2006 | Landfeldt et al. | |
| 2006/0274749 | A1 | 12/2006 | Beier et al. | |
| 2008/0307081 | A1 | 12/2008 | Dobbins et al. | |
| 2009/0100169 | A1 | 4/2009 | Allen et al. | |
| 2011/0004932 | A1* | 1/2011 | Spatscheck et al. | 726/13 |

(Continued)

Primary Examiner — Min Jung
(74) Attorney, Agent, or Firm — Hamilton, Brook, Smith & Reynolds, P.C.

(57) ABSTRACT

A method and system for improved network address translation (NAT) to enable efficient translation of packets destined for communication systems within a domain utilizing network addresses that are incompatible with the source and destination addresses indicated in packets delivered from the global Internet. Since the addresses are not compatible with global Internet addresses, delivery cannot be accomplished except by some method of address translation. Traditional systems have not been constructed to enable such inbound translations, providing instead only communications outbound from the incompatibly addressed domain towards the global Internet. An embodiment of the system employs deep packet inspection (DPI) search techniques known from widely deployed systems in use today, to acquire a resource identifier, and to attempt to match the resource identifier to complete the flow of traffic on a packet-by-packet basis.

39 Claims, 8 Drawing Sheets (56) References Cited

U.S. PATENT DOCUMENTS

| | | | |
|---|---|---|---|
| 2011/0182290 A1* | 7/2011 | Perkins | 370/389 |
| 2011/0185085 A1* | 7/2011 | Perkins | 709/245 |
| 2011/0202679 A1 | 8/2011 | Cohen et al. | |
| 2012/0033664 A1* | 2/2012 | Pignataro et al. | 370/389 |
| 2012/0240185 A1 | 9/2012 | Kapoor et al. | |
| 2012/0243547 A1* | 9/2012 | Pardo-Blazquez et al. | 370/401 |
| 2014/0053239 A1* | 2/2014 | Narayanaswamy | 726/1 |

* cited by examiner

METHOD AND APPARATUS FOR NETWORK ADDRESS TRANSLATION

RELATED APPLICATIONS

This application is a continuation-in-part of U.S. application Ser. No. 12/877,984, filed on Sep. 8, 2010 now abandoned, which claims the benefit of U.S. Provisional Application No. 61/276,108, filed on Sep. 8, 2009. The entire teachings of both of the above-referenced Applications are incorporated herein by reference. The teachings of all patents, published applications, and references cited herein are incorporated by reference in their entirety.

BACKGROUND OF THE INVENTION

As the Internet has evolved, the number of network-layer protocol addresses ($2^{32}$) has proved to be insufficient for maintaining full connectivity between the continually growing number of network devices attached to the Internet. For this reason, a new network-layer protocol, known as Internet Protocol version 6 (IPv6), has been designed to replace the currently deployed network-layer protocol, known as Internet Protocol version 4 (IPv4). The numbers 6 and 4 refer to the version numbers of the two protocols, respectively. This new address space, IPv6, supports $2^{128}$ (which is approximately $3.4 \times 10^{38}$) addresses; thereby making astronomically more unique network-layer addresses available for Internet devices. See, e.g., Internet Engineering Task Force (IETF) Request for Comments (RFC) 2373 and RFC 2460.

SUMMARY OF THE INVENTION

An example embodiment of the present invention includes a method of performing network address translation (NAT). The example embodiment performs a deep packet inspection (DPI) of a traffic packet having an external domain of a NAT device, the external domain address being associated with a pending flow (e.g., a flow that has not been established or allocated all necessary parameters) or previously established flow to a corresponding destination. The DPI can identify a destination address of the flow from within the traffic packet, with the flow being configurable to utilize the external domain address of the NAT device as a source address. Based on a result of the DPI, the embodiment further associates the external domain address and the destination address with the flow.

BRIEF DESCRIPTION OF THE DRAWINGS

The foregoing will be apparent from the following more particular description of example embodiments of the invention and as illustrated in the accompanying figures. The drawings are not necessarily to scale, emphasis instead being placed upon illustrating example embodiments of the present invention.

The accompanying figures where like reference numerals refer to identical or functionally similar elements throughout the separate views and which together with the detailed description below are incorporated in and form part of the Specification, serve to further illustrate various embodiments and to explain various principles and advantages all in accordance with the present invention.

DETAILED DESCRIPTION OF THE INVENTION

A description of example embodiments of the invention follows.

Example embodiments of the present invention include methods, apparatuses, and computer program products for network address translation employing deep packet inspection at a boundary between an external domain network with global addresses (e.g., the Internet) and an internal domain network with local address (e.g., a customer network). Although motivated by an impending need to support more addresses than Internet Protocol version 4 (IPv4) can handle given the growth in popularity of network devices, which gave rise to Internet Protocol version 6 (IPv6), as described immediately below, embodiments of the present invention more generally apply to any networks, now existing or hereinafter developed, having local and global addresses or an internal domain and external domain. Before describing embodiments of the present invention, a description of history and current developments of networking is presented.

An alternative method to the new network-layer protocol (i.e., IPv6) has been deployed, which is known as "network address translation," or NAT, and is often considered a temporary measure. Today, the access routers found in most households and business offices use NAT to enlarge the number of IPv4 addresses available to the computers attached to the household or business network, which may be referred to as "customer premises networks" or CPNs. NAT works by changing the IPv4 address given by the Internet Service Provider (ISP) into some other IPv4 address that belongs to a device connected to a CPN. This translated address is at the same time accessible by an access router (i.e., customer premises equipment, or CPE) connecting the ISP to the CPN. See RFC 2663. In most cases, the translated address, which identifies the device on the CPN, is also a private address. See RFC 1918.

Since the introduction of IPv6, various strategies have been proposed to help with the transition from IPv4 to IPv6. In the meantime, the widespread deployment of network address translators (NATs or NAT devices) for most customers has extended the lifetime of IPv4 so that there has not been as much immediate pressure for the adoption of IPv6. This is because the RFC 1918 private addresses consumed on the CPN are not required to be unique, and, thus, the same address space can be re-used many times.

Nevertheless, the IPv4 address allocation continues steadily, and the entire IPv4 address space will be depleted in the year 2011, or soon thereafter, at the latest. This means that there is still a very significant economic incentive towards making the long-delayed transition to IPv6, even though for most existing customers using RFC 1918 private addresses the effects are not noticeable. Much of the negative effect of IPv4 address depletion will be shouldered by new businesses, which may no longer be able to acquire an appropriate IPv4 address from their service providers. The details of managing CPE with NAT and private address space are the subject of a lively debate within the IETF and the Internet at large. See RFC 3424 for details.

When a device attached to a CPN has a private address, that device's IPv4 address can typically no longer be made available to the global Internet by way of a Domain Name System (DNS). The device can initiate outbound communications to a partner accessible at a globally unique Internet address, because that does not require the device's IPv4 address to be registered in the global DNS. Once the device's communications partner receives the initial packets sent by the device, a bidirectional communications stream can be maintained.

When the CPE (e.g., the access router with NAT functionality) translates the device's private address into the CPE's public address (as assigned by the ISP), it also typically allocates a new port number for the device. The CPE changes the device's outgoing data packets by translating the source IPv4 address and source port to be the CPE's IPv4 address (i.e., the IPv4 address of the NAT device) and the newly allocated source port. The new port is used to identify which CPN device should receive inbound packets from the newly initiated communication stream. Thus, the CPE creates an association between the device's private IPv4 address and a port number that is expected to be found in all inbound packets destined for that device. This association is maintained in a set of translation registers or tables that may be consulted for all inbound traffic from the global Internet.

Most such CPEs do not enable contact to the privately addressed devices to be initiated by other computers not on the CPN. Thus, NAT restricts the devices to run only "outbound" applications like web browsing, sending e-mail, and making outbound telephone calls. Such privately addressed devices cannot easily host servers or websites for the outside global Internet, and without further arrangements, these devices cannot receive telephone calls. Receiving e-mail has to be accomplished by initiating contact with an external mail server, which must passively store e-mail files until the privately addressed device initiates another e-mail client session. Thus, "push" services are more difficult for devices situated behind NAT devices.

Similar techniques used by CPEs to provide private addresses to devices on a CPN can also be used to connect IPv6 to the global IPv4 Internet, by way of the IPv4 address provided by the ISP. Using IPv6, there is no need for the CPN addresses to be re-used for multiple CPNs; put another way, IPv6 easily enables the availability of globally unique network-layer addresses. These globally unique addresses cannot typically be used to establish network communications with existing Internet websites that only understand version 4 of the Internet Protocol (i.e., the protocol that makes use of the IPv4 network-layer addresses). However, since the CPE translates the IPv6 device address into the IPv4 address assigned to the CPE router, the CPE enables the use of IPv6 for customer premises devices to work with the existing IPv4 Internet, just as it enables devices with private IPv4 addresses to use the global Internet.

Usually, before communications are initiated between two computers, such as devices with internetwork access capabilities on a global data communications system (e.g., the Internet), the initiating partner has to consult a DNS server to find the network-layer address of the desired destination partner. For this case, referred to as source Internet protocol NAT (SIPNAT), the destination computer must have its network-layer address registered with DNS server, even though there is no such requirement for the initiating computer. The initiating computer sends a DNS server query, which is often handled by several DNS servers cooperating to give access to all the Internet Protocol (IP) addresses that have been registered anywhere in the DNS server serving the global Internet. The query eventually arrives at the DNS server maintained for use by the CPE, which, for purposes of illustrating example embodiments of the present invention, will provide the IP address for some device on the CPN. This IP address is forwarded back to the initiating computer by way of a DNS server reply packet; IPv4 address information is contained within a "record" supplied as part of the DNS server reply. See RFC 1035.

Previous techniques (e.g., SIPNAT, IVI, etc.) have been proposed for facilitating the translation of packets from the Internet into the IPv6 or privately addressed domain. IVI has the defect of generally requiring static allocation of a global network interface for each internal destination. A DNS-based procedure is used by the SIPNAT proposal; this works well in most cases, but there are situations in which variations in the deployed behavior of the DNS server can introduce ambiguities into the results obtained by use of SIPNAT.

It has been observed that many network-based applications exchange data, which can in some way be used to characterize or identify the recipient. For instance, applications often negotiate a unique resource identifier, which the application can use as an index into a local resource database; this is particularly true for multi-threaded server applications. Of course, the association between the resource identifier and the destination may be far less transparent than the association between the destination and the IP address assigned to the destination.

Before describing in detail example embodiments that are in accordance with the present invention, it should be observed that example embodiments of the present invention reside primarily in combinations of methods or apparatus components related to method and system for communicating a plurality of packets between the customer premises and computers available by way of the global Internet. Accordingly, the methods or apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. In addition, although the terms "traffic packet" and "deep packet inspection" are being used, the terms are for convenience and other forms of communications signaling and inspection thereof, such as traffic frames, data signals, and the like, are contemplated to be within the scope of the present invention.

Example embodiments of the invention improve the operation of network address translators (NATs), network address translation devices (NAT devices), or network address translation boxes (NAT boxes), which are commonly employed for managing the forwarding interface between two computer networks that have incompatible addressing methodologies for the network layer addressability of the devices in the two networks. It should be understood that "NATs," "NAT devices," and "NAT boxes" are used interchangeably herein and may be in the form of hardware, firmware, software, or known or hereinafter developed combinations thereof.

One example embodiment of the present invention uses techniques from SIPNAT to set up an association between external and internal domain address or port-based flow translation, and then uses application-specific methods to discover a resource identifier. External domain, as used herein, can be associated with a global Internet address, client-side address, or public address; an internal domain can be associated with a local network address or private address. Once the discovered resource identifier has been recorded, it can be used to disambiguate any remaining decisions that may be caused by DNS server anomalies or strategies for averting Denial of Service attacks.

Example embodiments described herein enable computers, such as client-side devices, on the global Internet to initiate contact to devices connected to the CPN behind a NAT device function, with either IPv4 or IPv6 network-layer addresses. In one such example embodiment, when a packet arrives at the CPE, the access router employs its knowledge of a source port or flow translation that has been associated with the device connected to the CPN. In other words, various embodiments of the invention provide methods and systems for enabling computers on the global Internet to initiate contact to devices connected to the CPN behind a NAT device, with either IPv4 or IPv6 network-layer addresses.

Alternative example embodiments of the present invention can use SIPNAT and employ DPI to establish address/port flow translation from a source to a destination behind a NAT device.

Additional example embodiments of the present invention can allow for external domains with an IPv4 network addresses to initiate and maintain communications with internal domains with IPv6 network addresses without the NAT device having knowledge of the destination port number or having the communication already initiated. In one such example embodiment, the source IP address of a traffic packet can be used, for example, to select or determine the IPv6 destination address. Further example embodiments of the present invention may use the source port number to determine the IPv6 destination in order to exercise finer control in determining or selecting the destination.

In further alternative example embodiments of the present invention, bidirectional NAT can be employed for communications between an external domain and an internal domain (e.g., communications between an IPv4 network address and an IPv6 network address) using a DNS server. In one such example embodiment, the bidirectional communication does not require changes to either an IPv6-only host or router or an IPv4-only host or router. Additional advantages of one such example embodiment include an ability to delegate special or specified domains to the NAT device, no requirement or need to establish point-to-point tunnels (tunneling) or use of tunneling protocols in order to carry IPv6 packets over an IPv4 routing infrastructure, and no requirement for Dual IP layer (dual-stack) implementations or protocols in order to provide support for both IPv4 and IPv6 in hosts and routers. Some such example embodiments can model the communications in a manner similar to flow management, including multiple parameters, such a 5-tuple parameter including for an incoming flow, for example, the IPv4 destination address, the source port number, the NAT device address, the destination port number, and a type of service (TOS) parameter, which can be mapped or managed to an outgoing flow including 5-tuple parameters, such as an IPv4 map, a source port number, an IPv6 dev, a destination port number, and a TOS parameter.

Such example embodiments can run at line speeds by employing flow management, and such modeling can further provide for scalability and understanding of flow records. Alternative example embodiments of the present invention allow for a scalable approach by allowing each IPv4 addressed used by the incoming flows to be shared by multiple different IPv6-only devices. The degree of scalability of such an approach can vary on multiple factors; for example, scalability may be determined by the rate of arrival for new incoming connection requests or by the number of connection requests initiated from a particular IPv4 host.

It should be understood that IPv4 and IPv6 are merely examples of legacy and upgraded versions of communications protocols; embodiments of the invention can also be applied to other communications protocols. For convenience, embodiments of the invention are described relative to IPv4 and IPv6.

Figure 1A:
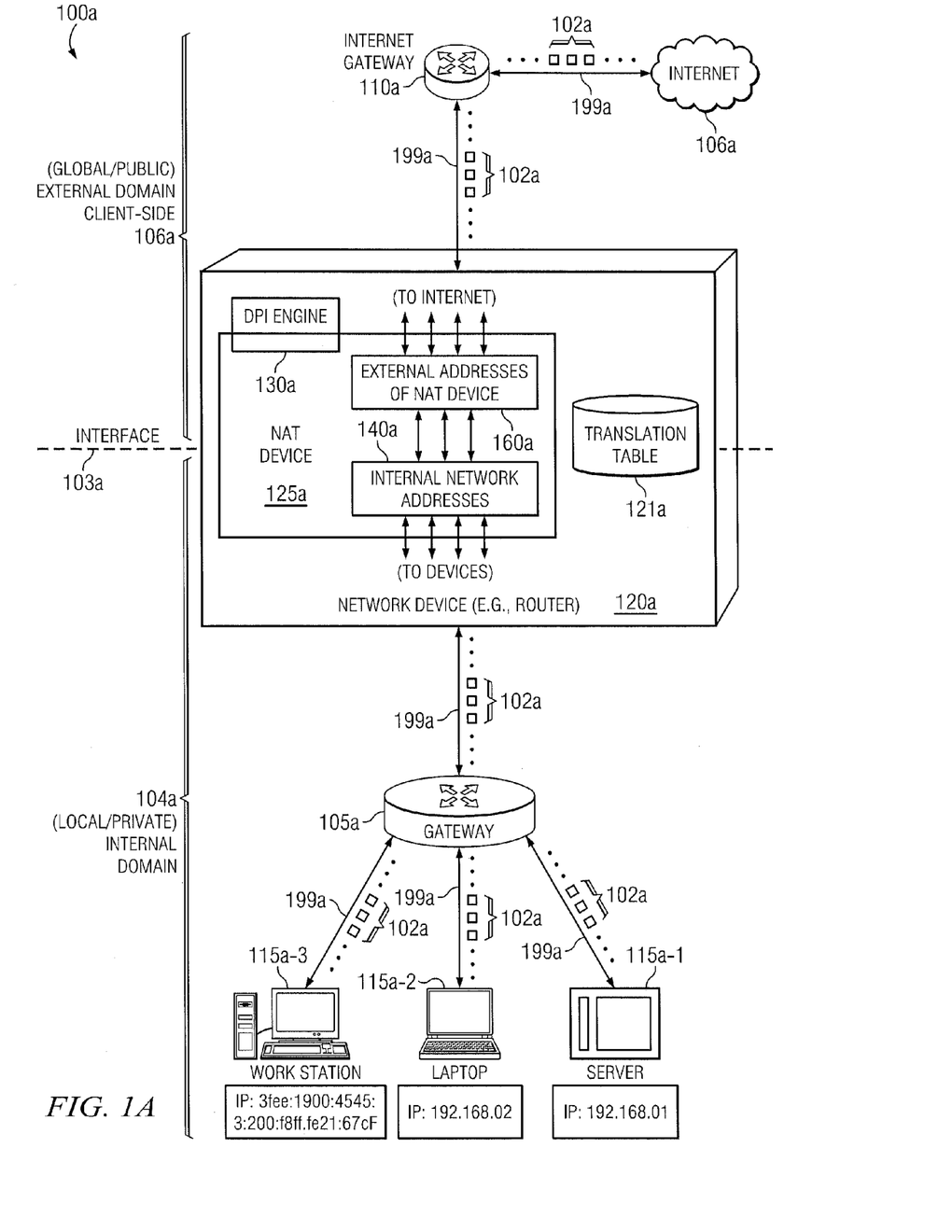
FIG. 1A is a network diagram of an example embodiment of the invention that illustrates operably interconnected network elements.

FIG. 1A is a high-level network diagram of an example embodiment of the invention that illustrates a communications internetwork 100a. The internetwork 100a can be any network or combination of networks, such as a global Internet 106a operably interconnected to a local network 104a, and can include a plurality of network elements, such as end user devices 115a(1-3), gateway 105, network device 120a, Internet gateway 110a, or other network elements currently known or future developed. In alternative example embodiments, the network device 120a can connect directly to the Internet 106a or other public networks (not shown) without the use of an intermediary network element, such as the Internet gateway 110a.

Example embodiments of the present invention can include network translation that works by translating a global Internet address (external domain address) to a local network address (internal domain address), and vice versa. Translation may also be used to translate one legacy communications protocol address, such as IPv4, into a different or updated communications protocol address, such as IPv6.

Example embodiments of the present invention provide for bidirectional communications using NAT while providing operational conveniences that will encourage the adoption of IPv6 by enabling IPv6-only devices to provide services to and communication with existing IPv4 devices. The specialized approaches provided by example embodiments of the present invention allow for forms of flow management where traffic flow through a NAT device is identified using source and destination IP address (and additional information if wanted) to allocate and deallocate resources for communication between IPv4 and IPv6 nodes.

Continuing to refer to the example embodiment of FIG. 1A, traffic 102a, originating at a source, such as an external domain 106a (also referred to herein as a global Internet, public domain, or client-side domain), may travel toward a destination, such as an internal domain 104a (also referred to herein as a local domain or private domain) via a medium, such as links 199a. The links 199a can be some combination of wired links, optical links, wireless links, and the like. The entities communicate by exchanging traffic packets according to a pre-defined set of network protocols, such as the Transmission Control Protocol/Internet Protocol (TCP/IP), or other currently known or future developed communications protocols. The traffic 102a can be forwarded to a corresponding gateway 105a via the medium 199a. The gateway 105a can be any of a multitude of wireless or wired gateways, such as an Application Layer Gateway (ALG), Access Signaling Node Gateway (ASN-GN), Gateway GPRS Support Node (GGSN), Serving General Packet Radio Service Support Node (SGSN), System Architecture Evolution (SAE)

gateway, or other currently known or hereafter-developed gateway. In alternative example embodiments of the present invention, the gateway 105a can be any network node, such as a router, that can provider interoperability between networks using the same or different communications protocols. The gateway 105a can maintain, or be operably interconnected to, a network address translation (NAT) device 125a.

An example embodiment of the present invention further can include the NAT device 125a to perform network translation on the network address information included within a header of the traffic packet 102a by translating an internal (e.g., private) network address 140 to an external (e.g., global) network address 160a, and vice versa, relative to the NAT device 125a. The NAT device 125a can maintain records of translations in a translation table 121a, which can be accessible to a Deep Packet Inspection (DPI) engine 130a or other network elements as may be needed. Alternatively, the network device 120a in which the NAT device 125a can maintain the translation table that is shown in the embodiment of FIG. 1A, 121a. After the network address translation is complete, the traffic packet 102a is forwarded to its destination, such as any of the end user devices 115a-1 . . . 3.

Alternative example embodiments of the present invention can include the NAT device 125a, which can share a single external Internet Protocol (IP) network address, or a limited number of external IP network addresses, between a network of machines or elements. Specifically, example embodiments of the NAT device 125a can alter the IP header (not shown) of the traffic packet 102a as it flows from a source to a destination through the NAT device 125a, in which case the NAT device 125a can optionally change the source address of the IP traffic packet, destination address of the IP traffic packet, or both addresses as the NAT device 125a or network device 120a sends the traffic packet 102a on its way from source to destination. The NAT device 125a can maintain records of the flow of packets across the network device 120a.

In an embodiment of the invention, as time goes on, at least for the most popular resource servers, statistics are kept that indicate reliability of using the resource identifier (along with other information from the application packets exchanged) as a means for identifying the destination. In other words, each such resource identifier is recorded along with an indication about the degree of certainty of the actual destination. In most cases, the destination will, in fact, be known for certain (for instance, with HTTP 1.1 payloads). If it is discovered that the same resource identifier is reliably associated with two different destinations, then the identifier cannot be used as the sole determinant for delivering payloads to the destination, and an additional example embodiment of the present invention, such as one in which DPI can be employed to determine the destination can be employed. Nevertheless, the restricted set of destinations that are shown to host resources with the same resource identifiers can still be profitably used to disambiguate future deliveries.

Figure 1B:
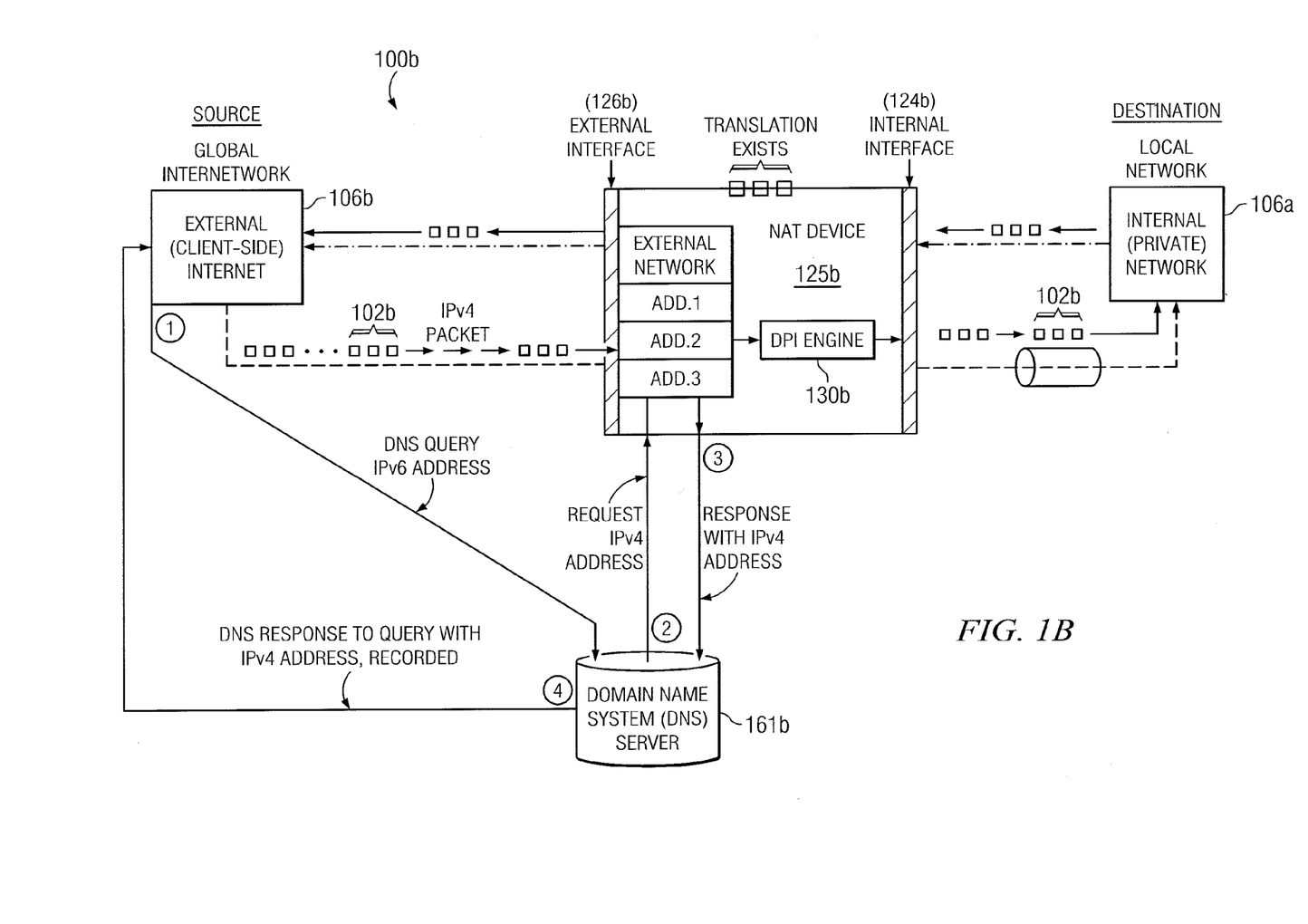
FIG. 1B is a network diagram of an example embodiment of the invention that illustrates operably interconnected network components to perform network address translation between a source and a destination.

FIG. 1B is a network diagram of an example embodiment of the invention that illustrates a communications internetwork 100b employing bi-directional source Internet Protocol network address translation (SIPNAT). The example network 100b illustrates a source, such as global internetwork 106b connected to a destination, such as local network 104b. The global internetwork 106b can be known as an external network, client-side network, or public network, any of which are used herein interchangeably. Additionally, the local network 104b can be known as an internal network or private network, also used herein interchangeably. The source 106b can be operably interconnected to the destination 104b via any communications interface or medium (e.g., an optical fiber, copper wire, or air interface), which is operably interconnected to a network address translation (NAT) device, which, for example, can be located at a network router or node.

Example embodiments of the present invention can employ SIPNAT to establish address/port flow translation by employing deep packet inspection of traffic packets in the flow, as described below. The example network 100b of FIG. 1B can enable a server to initiate contact with a client, and vice versa, without parameters for each flow having to be established by the internal network node. Using SIPNAT, an external domain 106b can query a domain name system (DNS) server 161b to establish or complete the required parameters (i.e., a source address for a traffic packet arriving at the NAT device, a destination address for a traffic packet arriving at the NAT device, a source address of the traffic being transmitted from the NAT device, and a destination address of the traffic being transmitted from the NAT device) for the flow translation, which is explained in detail below in reference to FIG. 3B. The external domain 106 can send a DNS query for a fully qualified domain name (FQDN), where the FQDN can identify a device with an IPv6 address.

Continuing to refer to FIG. 1B, when the DNS 161b allocates an external (source) domain NAT address 160b on a NAT device 125b, the traffic flow is in a pending state because only three of the four addresses are known (i.e., the destination (internal) IP address for the packet, destination (internal) NAT IP address for the packet on the internal domain, and source (external) NAT IP address for the packet on the external domain). When the packet arrives at an external NAT interface 126b, if that packet does not match any existing, previously established, or pending flow being maintained at the external NAT interface 126b, then that packet is considered to establish the pending flow. The source (external) IP address of the incoming packet is used to finish the required quadruplet of addresses. In alternative example embodiments of the present invention, the NAT device 125b can be operably interconnected to a translation table (not shown), which can maintain IP addresses in order to map addresses to a single IP address and readdress the outgoing IP packet so the source IP address of the internal packet appears as the source IP address of the NAT device.

In order to complete a traffic flow, the NAT device, or other operably interconnected physical or logical element, determines the source address of all traffic flows pending at the external interface of the NAT device. If the determined source address has a pending flow, then the NAT IP address is established as the source address of the traffic packet, thereby completing the quadruplet information of the flow, which causes the flow to no longer be in a pending state. A completed flow may be forwarded to the destination of the traffic packet with the readdressed source IP address being the source NAT IP address.

In alternative example embodiments of the present invention, the DNS-based setup can provide IPv4 addresses for communication with an IPv6 device and use a source IP address to select of allocate the IPv6 destination. The example embodiment can further use the source port number to maintain and exercise finer control of traffic communications between the IPv4 and IPv6 addresses. The example embodiment further provides for bidirectional network address translation between external and internal domains using different or incompatible communications protocols. In the example embodiment employing bidirectional NAT using the DNS and SIPNAT, translation is simplified and does not have dual-stack requirements or tunneling or encapsulating of the IPv6 packets in IPv4 packets.

In alternative example embodiments of the present invention, after the initial contact to the DNS server, by which the flow translation has been initialized, additional operations can be employed to ensure delivery of the traffic packet 102*b* to the proper destination. In particular, in one embodiment, when a payload containing the resource identifier arrives for disposition by the NAT device, the NAT device 125*b* can use deep packet inspection (DPI) in order to determine the destination for the traffic packet. A DPI engine 130*b* can parse the payload of the traffic packet in order to inspect stored data about a resource identifier that can be used to disambiguate problematic deliveries.

Specifically, DPI can identify the destination address from within the application payload of a traffic packet, where the payload can start after the transport layer, such as the UDP/TCP/STCP. While it is possible to use DPI to inspect the shallow layers of a traffic packet, such as the TCP/IP headers, DPI is used in example embodiments of the present invention to inspect data in relation to where the payload in the traffic packet begins. For example, the network device can be operably interconnected to any network equipment currently known or hereafter developed for inspecting any layer of a traffic packet. The DPI engine 130*b* is configured to inspect layers of the packet using advanced packet examination to reach deeper layers of the packet, beyond the header and IP address information. While DPI can be used to inspect all levels of a traffic packet, DPI is considered to view specifically the transport and application layers in order to discover a detailed understanding of the type of traffic transported in the network, and any other information that is currently known to be maintained or any future maintained information located in the transport and application layers. In this way, the payload itself can be used to identify the destination computer. Consequently, the destination computer can be properly inferred merely by inspecting the payload of the incoming packet, thereby completing the flow and reducing the need for relying only on the fields of the packet headers.

In further alternative example embodiments of the present invention, when a flow being maintained at the external interface 126*b* of the NAT device 125*b* is in a pending state, the pending address would be the address of the NAT device, which would cause the DNS server 161*b* not to provide the external domain address. When an address is in pending state on the NAT device 125*b*, that address cannot be used by the DNS server 161*b* for another flow until the pending flow is established and that address is no longer in the pending state. For a similar rationale, the NAT device translation table cannot maintain two traffic flows with the same source address because each source address is used by the NAT device to determine to which destination to forward the traffic packet. As such, in further alternative example embodiments of the present invention, the directionality of the traffic flow is useful because, when an application wants to transmit traffic to a destination in the network, the application looks to the DNS server for information.

Figure 2:
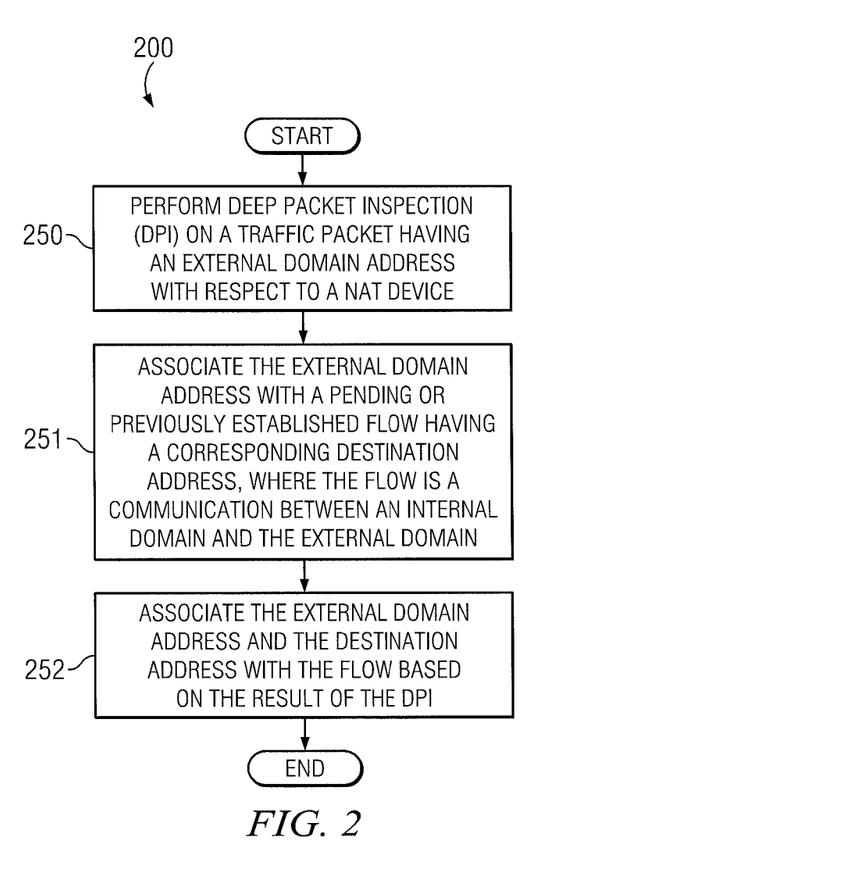
FIG. 2 is a flow chart of an embodiment of the present invention that illustrates functions involved in performing network address translation.

FIG. 2 is a flow chart 200 illustrating a method by which a network address translation (NAT) device, such as the NAT device 125*a* of FIG. 1A, can perform network address translation according to an example embodiment of the present invention. According to the example embodiment, the flow chart 200 performs deep packet inspection (DPI) on a traffic packet having an external domain address of a NAT device (250). The external domain address can be associated with a pending or previously established flow having a corresponding destination address, where the flow is a communication between an external domain and an internal domain (251). The NAT device may associate the external domain address and the destination address with the flow based on the result of the DPI (252).

Figure 3A:
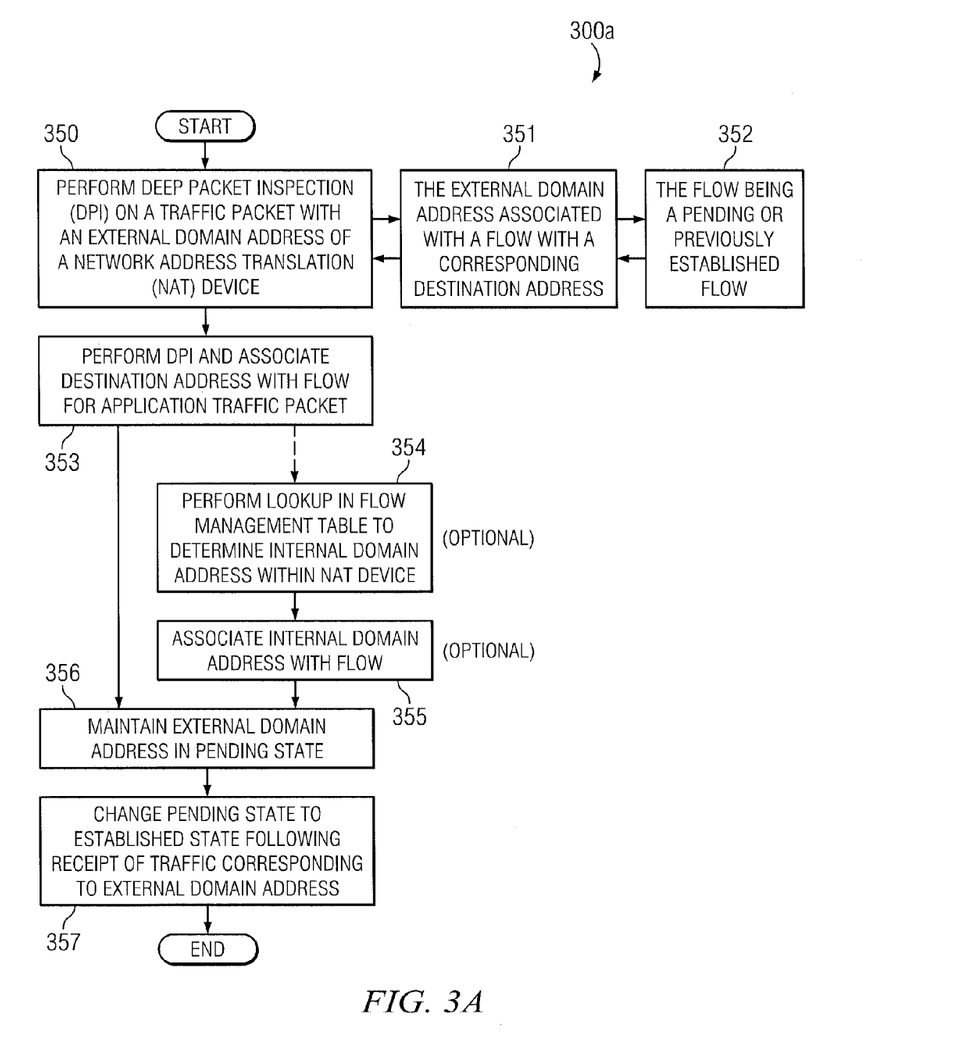
FIG. 3A is a flow diagram of an embodiment of the present invention that illustrates a method of performing deep packet inspection for use with network address translation.

FIG. 3A is a flow diagram 300*a* of an embodiment of the present invention that illustrates a method of performing deep packet inspection (DPI) for network address translation (NAT). The example embodiment can be performed in a network device, such as the network device 120 in FIG. 1A, or other network elements or sub-elements operably interconnected in a communications network, such as the network 100*a* of FIG. 1A.

After beginning, the inspection procedure of FIG. 3A performs DPI on a traffic packet with an external domain address of a NAT device (350). Based on the inspection of the traffic packet, the external domain address is associated with a traffic flow, where the traffic flow corresponds to a destination address (351) and is a pending flow or a previously established flow (352). If the external domain address is not associated with a pending or previously established flow, then the inspection procedure of FIG. 3A performs DPI on the traffic packet to determine a destination address of the traffic packet that can be stored in the payload of the packet (353), and, alternatively, used to establish a new flow.

Alternatively, in an example embodiment, the destination address can also be associated with a flow by optionally performing a lookup in a flow translation table to determine the internal domain address associated with the NAT device (359). In the alternative embodiment, the destination address and the internal domain address of the NAT device can optionally be associated with the traffic flow (355).

In either or both example embodiments, the inspection procedure of FIG. 3A can maintain the traffic flow in a pending state (356) until receipt of a traffic packet with a sourced address of the device in the external domain arriving at the NAT device. Upon receipt, the procedure of FIG. 3A can modify the pending state status of the traffic flow to an established state status, thus, forwarding the traffic flow to its destination (357).

Figure 3B:
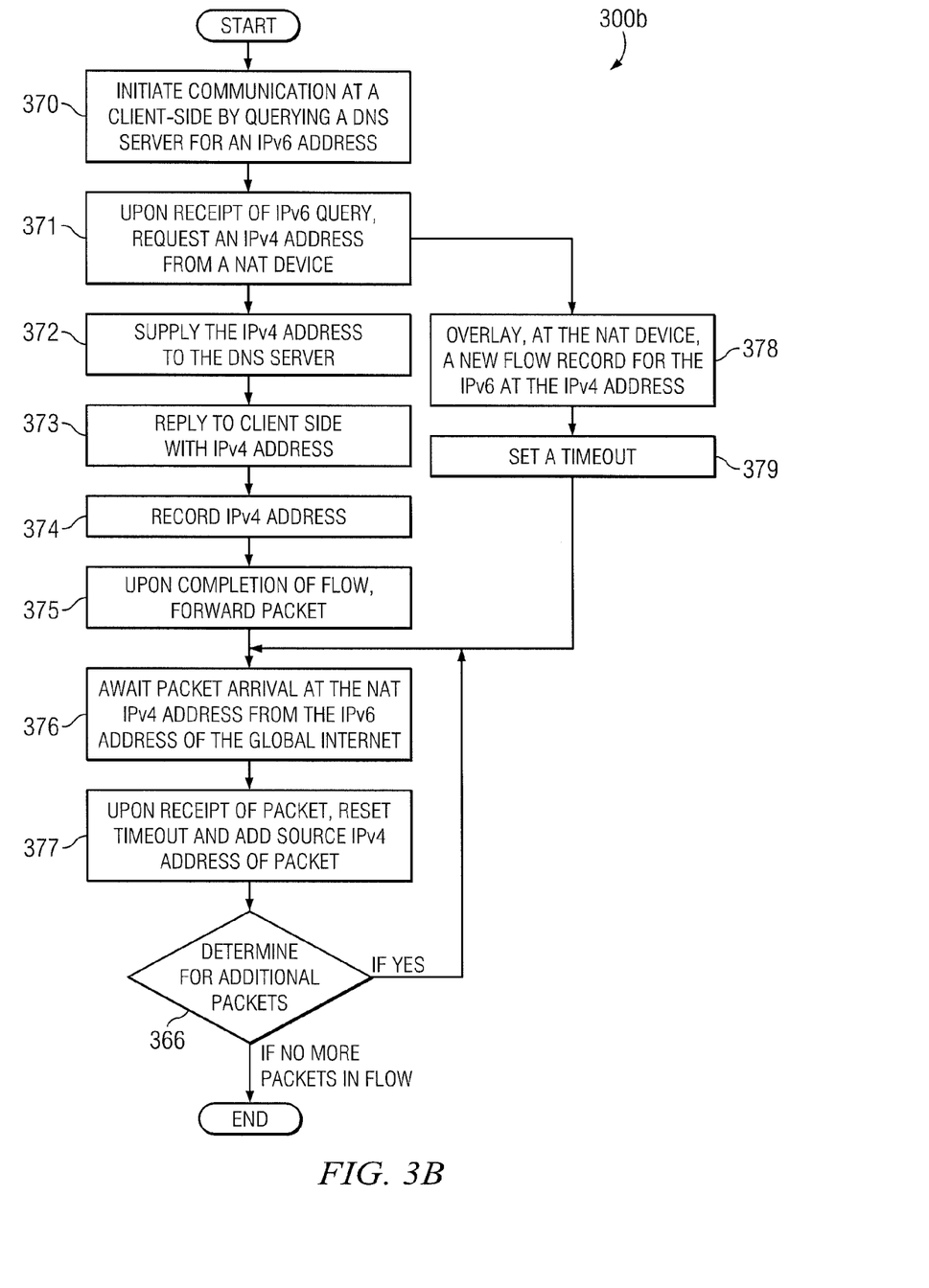
FIG. 3B is a flow diagram of an embodiment of the present invention that illustrates a method of employing source Internet Protocol network address translation.

FIG. 3B is a flow diagram 300*b* of an embodiment of the present invention that illustrates a method of querying a domain name system (DNS) server for use in network address translation (NAT). Example embodiments can be performed in a network device, such as the network device 120*b* in FIG. 1B, or other network elements or sub-elements operably interconnected in a communications network, such as network 100*b*. In example embodiments of the procedure of FIG. 3B, a pending flow record can be established when a first traffic packet of the flow is received, because once the first traffic packet of the flow is received, the source IP address is then available. Once the flow record is complete (i.e., no longer in a pending state), all future packets from the source IP address to the NAT device address, and, if applicable, the port, will be translated according to values in the flow record.

For instance, referring to flow diagram 300*b*, after beginning, the communication procedure of FIG. 3B, a client-side device, such as a device in the global Internet, initiates communication by querying the DNS server for a request of an IPv4 address, whereby the FQDN identifies a device have only an IPv6 address (370). Upon receipt of the DNS query, the DNS server, such as the DNS server 161 in FIG. 1B, requests an IPv4 address from a NAT device, such as the NAT device 125*b* in FIG. 1B (371). The NAT device can further perform both functions simultaneously or in a determined order.

Specifically, the NAT device can supply the IPv4 address to the DNS server (372), which, in turn, can respond to the client-side device providing to it the requested IPv4 address (373). The client-side device can record the received IPv4 address in a table or other memory (374), and, upon completion of the client flow information needed, the client-side domain can forward the traffic packet (375). In an alternative example embodiment, the NAT device, upon receipt of the IPv6 query from the DNS server, can overlay a new flow record for the IPv6 address at the IPv4 address (378) and set a timeout parameter for the new flow (379). At the NAT device, the pending flow, which has a set timeout parameter, awaits a packet containing the recorded IPv4 address of the global Internet (376). Following receipt of the packet, the NAT device resets the timeout parameter and adds the source IP NAT address to the pending flow record (377). After all traffic information is known in order to complete for the flow, the communication procedure of FIG. 3B determines if additional packets exist for the pending flow or previously established flow (366); if additional packets exist and the packets are associated with the pending or previously established flow, then the packets do not require additional network address translation. If no additional packets exist for the flow, the procedure is terminated, and the traffic flow is forwarded to its determined destination.

Figure 4:
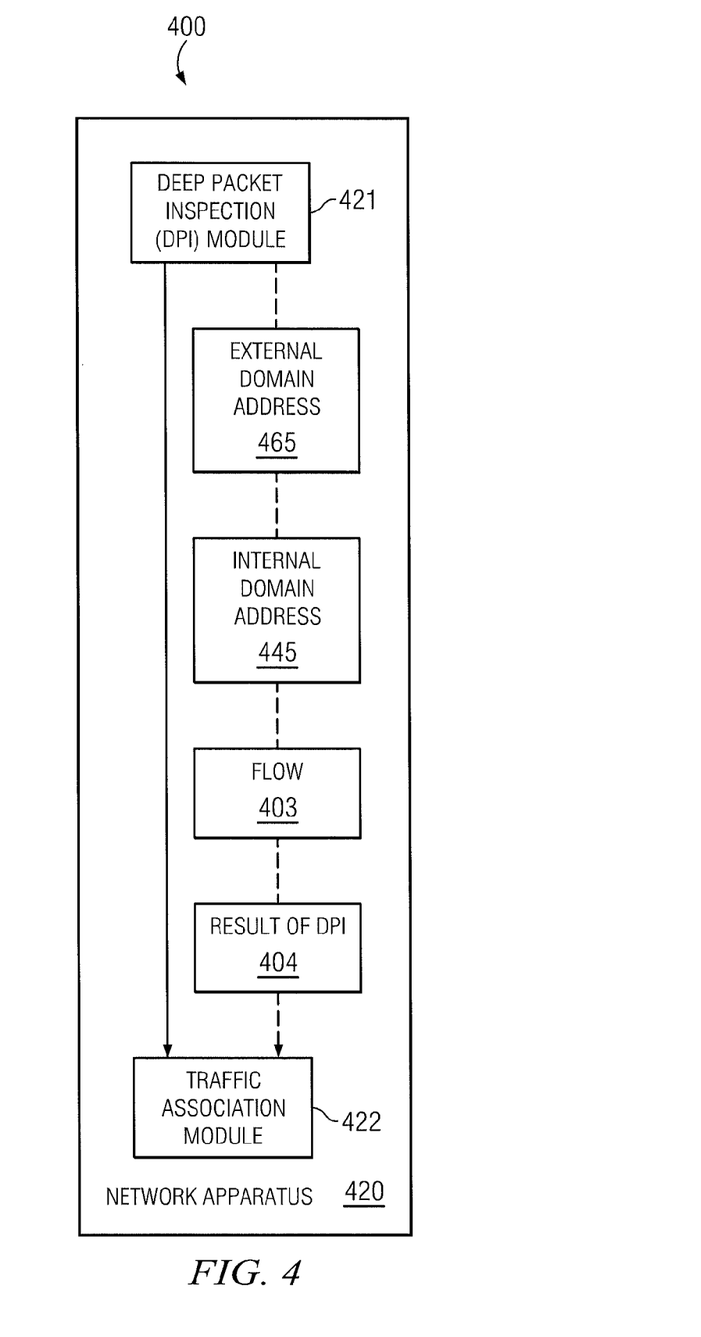
FIG. 4 is a block diagram of an embodiment of the present invention that illustrates components involved in performing network address translation employing deep packet inspection.

FIG. 4 is a block diagram 400 of a network apparatus 420, such as the network device 120a of FIG. 1A, according to an example embodiment of the present invention. Components of the network apparatus 420 can include a deep packet inspection (DPI) module 421 and a traffic association module 422. According to the example embodiment, the DPI module 421 can perform DPI on a traffic packet in a communications network from a source (external domain) to a destination (internal domain), or vice versa. Further, the DPI module 421 can be employed to ensure delivery of traffic packets to the proper destination. The DPI module 421 can parse the traffic packet for information located in the packet payload, which contains additional information regarding the destination of the packet and other information specific to the network-address layer, such as application-specific information or resource identifier information. The DPI module 421 can transmit all or some of the results of the DPI to the traffic association module 422; for example, the DPI module 421 can transmit the external domain address 465, the internal domain address 445, the traffic flow 403, and/or alternative and additional results 404 of the DPI. The traffic association module 422 can associate the external domain address 465 with the traffic flow 403, including additional information corresponding to a destination address of a pending or previously established flow.

Alternative example embodiments of the modules 421 and 422 of block diagram 400 can be located at a network element or sub-element interconnected operably in a communications network. Further alternative example embodiments of the present invention can include modules being in a system of any physical or logical configuration.

Figure 5:
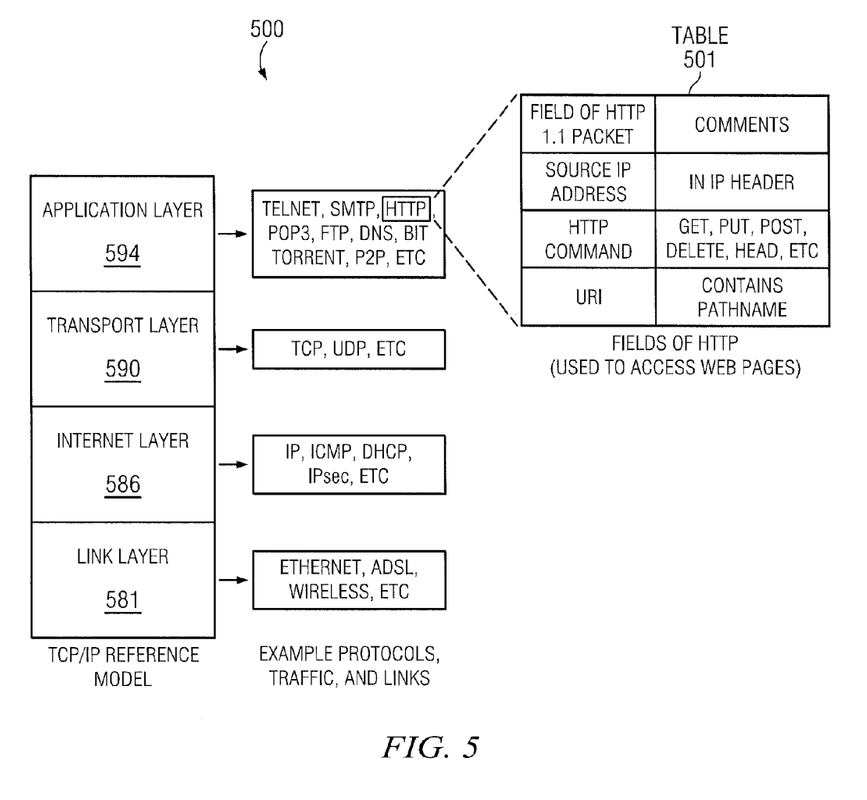
FIG. 5 is a diagram of an embodiment of the present invention that illustrates a TCP/IP reference model.

FIG. 5 is a diagram 500 of an embodiment of the present invention that illustrates components of a TCP/IP reference model 580. Deep packet inspection (DPI), as detailed above in reference to FIG. 1B, can inspect all layers of a traffic packet, including the payload of the packet which can exist at layers after the transport layer 590, such as the application layer 594 as described below. The TCP/IP reference model 580 is one type of model to view or divide a communications network into smaller categories, such as layers. Each layer of the TCP/IP reference model 580 can communicate with the layer directly above or directly below itself.

The bottom layer, the link layer 581, is logically closer to the physical transmission of data among elements or sub elements in a network, such as Media Access Control (e.g., Ethernet or DSL). The Internet layer 586 can, for example, allow for the routing and controlling of traffic between hosts, such as a source and destination pair. The transport layer 590 enables end-user traffic transfer; typical examples include transmission control protocol (TCP) or user datagram protocol (UDP). The top layer, the application layer 594, is logically closest to the user application and can interact with a software application (e.g., Telnet, Simple Mail Transfer Protocol (SMTP), Hypertext Transfer Protocol (HTTP), Post Office Protocol 3 (POP3), File Transfer Protocol (FTP), Domain Name System (DNS), BitTorrent client (BitTorrent), Peer-to-Peer (P2P) etc.) that an end-user employs via a user interface or other tools of the software application. A person of ordinary skill in the art would understand that each network layer described above includes a multitude of additional functions and capabilities, and the descriptions above are provided as a brief overview and not the totality of the TCP/IP reference model for purposes of providing context for the example embodiment illustrated in FIG. 5.

In an example embodiment of the present invention, a table 501 illustrates example fields of a typical application packet, specifically a Hypertext Transfer Protocol (HTTP) packet, which is used to fetch web pages on network nodes. Each fetch or access to a web page by the HTTP packet must contain a specific pathname that is valid on the remote computer that identifies the desired web page. In example embodiments that employ DPI to inspect the application traffic payload, such as the HTTP packet illustrated in table 501, the inspected payload can improve salability and robustness of the using known payload fields for certain applications and protocols. For example, the payload fields can provide or identify the destination for the traffic.

In alternative example embodiments of the present invention, other reference models, such as an OSI reference model, may be used to understand or program deep packet inspection modules. Alternative embodiments may also maintain deep packet inspection modules at any location or network element in a communications network, such as the network 100b in FIG. 1B or operably interconnected remote internetworks.

Figure 6:
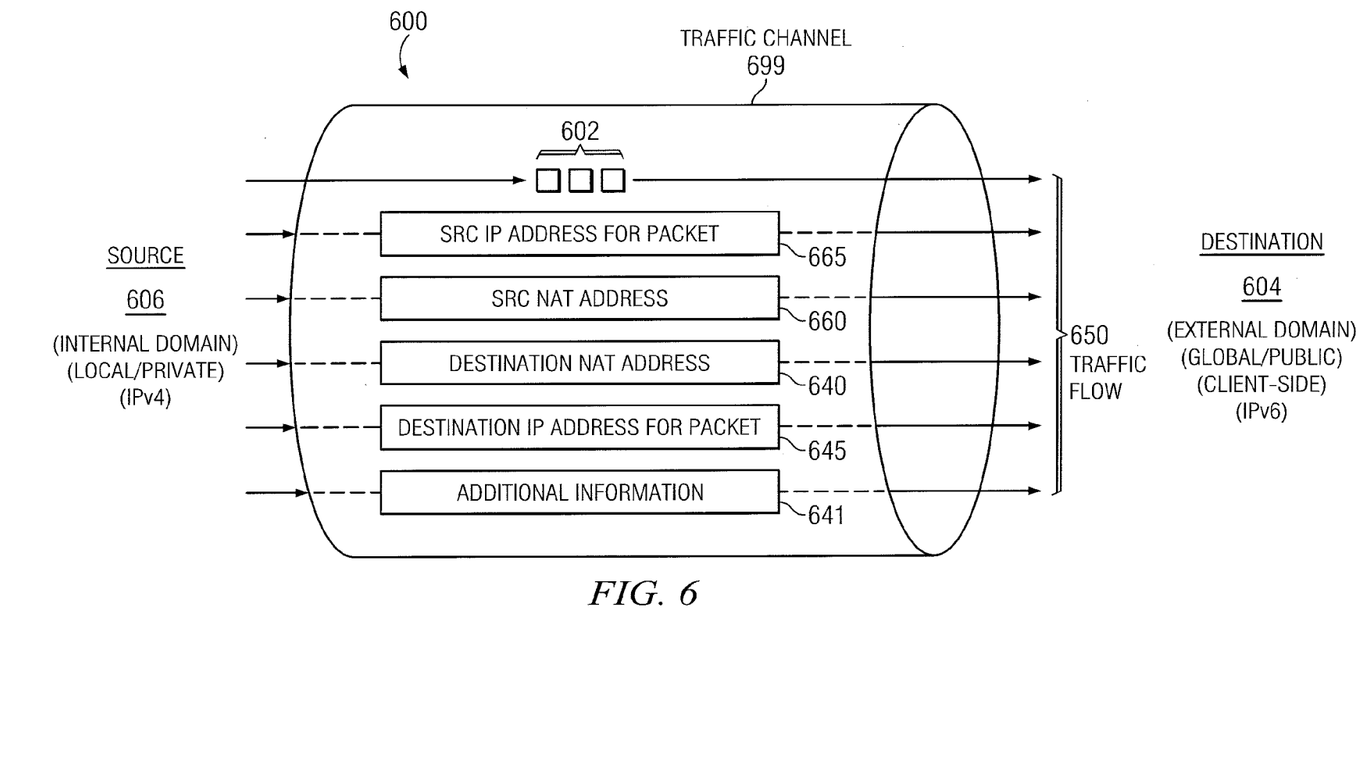
FIG. 6 is a diagram of an example embodiment of the present invention that illustrates traffic in a channel.

FIG. 6 is a diagram of an example embodiment of the present invention including a traffic channel 699 supporting various communications protocols, simultaneously, individually, time division multiplexed, or combinations thereof. In example embodiments of the present invention, performing DPI on all packets in a traffic channel or traversing the NAT device can determine a specific Application-level Gateway (ALG) or router to use for flow management. By employing DPI in this manner, the ALG can support network address/ port translation for application layer protocols that may otherwise fail to traverse the NAT device. For example, the traffic channel 699 can support traffic, including P2P traffic, voice over Internet Protocol (VoIP) traffic, FTP traffic, BitTorrent traffic, or other protocol and application traffic currently known or hereinafter developed. The traffic channel 699 can be supported by any embodiments of the invention disclosed herein, such as those example embodiments that employ deep packet inspection and related activities.

The traffic channel 699 can provide support for the communications via a traffic flow 650, where the traffic flow 650 is from a source 606 to a destination 604 in an internetwork. The source 606 can be any of an external domain of an internetwork, client side of an internetwork, public network, or hereinafter developed network. The destination 604 can be any of an internal network, private network, or hereinafter developed network. In alternative example embodiments of the present invention, the traffic flow 650 can contain additional information 641 about a traffic packet, or the traffic packet 602 itself.

Continuing to refer to the example embodiment of FIG. 6, the traffic flow 650 is a communication between the source 606 and the destination 604 on the internetwork or plurality of interconnected networks. Every packet in the flow, and in general, will have a source address and a destination address. Each traffic flow 650 will have at least four parameters: (1) a source address for a packet arriving at the NAT device from the external domain will have the address of the device in the external domain 665, (2) a destination address for a packet arriving at the NAT device from the external domain will have the NAT address on the external side 660, (3) a source address of a packet transmitted from the NAT device to the IPv6 device will have the NAT address on the internal side 645, and (4) a destination address of a packet transmitted from the NAT device to the IPv6 device will have the destination address of the device in the internal domain 640 from the internal domain.

In example embodiments of the present invention, the flow 650 is established only once all four address parameters are known, and only one address (i.e., the source address for a packet arriving at the NAT device from the external domain will have the address of the device in the external domain 665) is missing when the flow record is pending; in other words, if less than four addresses are known, the flow is considered to be in a pending state. For instance, when the DNS server, such as the DNS server 161b of FIG. 1B, allocates the external NAT address 660 on the NAT device, that flow remains in a pending state because only three of the four addresses are known. When a traffic packet arrives at the external domain side of the NAT device for a pending flow, that packet can be used to establish or complete the pending flow if that packet does not match any of the existing flows at the external domain NAT address. In other words, the external domain source address of that traffic packet can be used to complete the required quadruplet of addresses, thereby establishing the flow.

In alternative example embodiments of the present invention, the traffic flow 650 can contain additional information 641 or other information as is currently known or future developed relevant to the flow of traffic. When all four addresses (i.e., addresses 665, 660, 645, and 640) are known, the traffic flow 650 is established. Only an established traffic flow 650 can be forwarded to the identified destination.

Further alternative example embodiments may allow for traffic flow to originate at the internal domain of a private network and flow towards an external domain of a public network. In such alternative example embodiments, for a traffic packet emanating from the internal IPv6 device, the source and destination addresses are correspondingly reversed for such outgoing packets. In addition, example embodiments can allow for bidirectional traffic flow between an external domain and an internal domain, where the communications can be initiated by either the external domain or the internal domain.

In alternative example embodiments of the present invention, a network with two different destinations can use the NAT device to communicate with two different destinations in the privately addressed (internal domain) network. In the example embodiments of FIG. 1B and FIG. 3B, the SIPNAT request to a domain name system (DNS) server enables the network address translation that is dependent on the source IP address, and permits establishing two identifiable flows, one per destination. In some example embodiments of the present invention, the use of flow management allows traffic to be transmitted at line rates; and, by employing DPI and SIPNAT, traffic packet delivery can be guaranteed at 100 percent accuracy.

Further example embodiments of the present invention may include a non-transitory computer readable medium containing instruction that may be executed by a processor, and, when executed, cause the processor to monitor the information, such as components or status, of at least a first and second network element. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While the present invention has been particularly shown and described with references to example embodiments thereof, it will be understood by those skilled in the art that various changes in form and details may be made therein without departing from the scope of the invention encompassed by the appended claims.

What is claimed is:

1. A method of performing network address translation, the method comprising:
 performing a deep packet inspection (DPI) of a traffic packet having an external domain address of a network address translation (NAT) device, the external domain address being associated with a pending or a previously established flow having a corresponding destination address, the flow being a communication between an external domain and an internal domain;
 based on a result of the DPI, associating the external domain address and the destination address with the flow;
 performing a look-up based on the destination address to determine an internal domain address within the NAT device; and
 associating the internal domain address with the flow.

2. The method according to claim 1 wherein, for an application traffic packet, performing the DPI and associating the destination address with the flow occurs on a packet-by-packet basis.

3. The method according to claim 1
 wherein the look-up is performed in a flow management table.

4. The method according to claim 1 wherein the external domain address is a legacy communications protocol address and wherein the internal domain address is an upgraded version of the legacy communications protocol address.

5. The method according to claim 4 wherein the external domain address is an Internet Protocol version 4 (IPv4) address and wherein the internal domain address is an Internet Protocol version 6 (IPv6) address.

6. The method according to claim 1 wherein the external domain address of the NAT device is an IPv4 address and wherein the internal domain address of the NAT device is an IPv4 address.

7. The method according to claim 1 wherein the external domain address and the internal domain address use the same or different network communications protocol addressing.

8. The method according to claim 1 wherein performing the DPI includes performing the DPI at an application layer, a transport layer, an Internet layer, or a network access layer of a TCP/IP stack.

9. The method according to claim 8 wherein performing the DPI identifies the destination address of the flow from within a payload of the traffic packet, the payload beginning after transport information in a header of the traffic packet.

10. The method according to claim 1 wherein performing the DPI further includes locating a destination host name in a payload of the traffic packet using application-specific information to parse the traffic packet.

11. The method according to claim 10 wherein performing the DPI further includes inspecting application payload of the traffic packet.

12. The method according to claim 1 wherein the flow maintains at least four parameters:
for a packet arriving at the NAT device, a source address being an address of a device in the external domain and a destination address being a NAT address on an external side of the NAT device; and
for a packet being transmitted from the NAT device, a source address being the NAT address on the external side of the NAT device and a destination address being an address of a device in the internal domain.

13. The method according to claim 1 further comprising:
maintaining the external domain address in a pending state following receipt from another network node that the external domain address was given to an external node; and
changing the pending state to an established state following receipt of traffic corresponding to the external domain address.

14. An apparatus for performing network address translation, the apparatus comprising:
a deep packet inspection (DPI) module configured to perform deep packet inspection of a traffic packet having an external domain address of a network address translation (NAT) device, the external domain address being associated with a pending or a previously established flow having a corresponding destination address, the flow being a communication between an internal domain and an external domain;
a traffic association module configured to associate the external domain address and the destination address with the flow based on a result of the DPI; and
a look-up module configured to perform a look-up based on the destination address to determine an internal domain address within the NAT device, the traffic association module further configured to associate the internal domain address with the flow.

15. The apparatus according to claim 14 wherein, for an application traffic packet, the DPI module and traffic association module are configured to operate on a packet-by-packet basis.

16. The apparatus according to claim 14 wherein the look-up module is further configured to perform the look-up in a flow management table.

17. The apparatus according to claim 14 wherein the external domain address is a legacy communications protocol address and wherein the internal domain address is an upgraded version of the legacy communications protocol address.

18. The apparatus according to claim 17 wherein the external domain address is an Internet Protocol version 4 (IPv4) address and wherein the internal domain address is an Internet Protocol version (IPv6) address.

19. The apparatus according to claim 14 wherein the external domain address is an IPv4 address and wherein the internal domain address is an IPv4 address.

20. The apparatus according to claim 14 wherein the external domain address and the internal domain address use the same or different network communications protocol addressing.

21. The apparatus according to claim 14 wherein the DPI module is further configured to perform DPI at an application layer, a transport layer, an Internet layer, or a network access layer of a TCP/IP stack.

22. The apparatus according to claim 21 wherein the DPI module is further configured to identify the destination address of the flow from within a payload of the traffic packet, where the payload begins after transportation information in a header of the traffic packet.

23. The apparatus according to claim 14 wherein the DPI module is further configured to locate a destination host name in a payload of the traffic packet by using application-specific information to parse the traffic packet.

24. The apparatus according to claim 23 wherein the DPI module is further configured to inspect application payload of the traffic packet.

25. The apparatus according to claim 14 wherein the flow maintains at least four parameters:
for a packet arriving at the NAT device, a source address being an address of a device in the external domain and a destination address being a NAT address on an external side of the NAT device; and
for a packet being transmitted from the NAT device, a source address being the NAT address on the external side of the NAT device and a destination address being an address of a device in the internal domain.

26. The apparatus according to claim 14 further comprising:
an address state tracking module configured to:
maintain the external domain address in a pending state following receipt from another network node that the external domain address was given to an external node; and
change the pending state to an established state following receipt of traffic corresponding to the external domain address.

27. A computer program product including a non-transitory computer readable medium having stored thereon computer readable instructions to perform network address translation, wherein the computer readable instructions, when executed by a processor, cause the processor to:
perform a deep packet inspection (DPI) of a traffic packet having an external domain address of a network address translation (NAT) device, the external domain address being associated with a flow having a corresponding destination address, the flow being a communication between an internal domain and an external domain;
associate the external domain address and the destination address with the flow, based on a result of the DPI;
perform a look-up based on the destination address to determine an internal domain address within the NAT device; and
associate the internal domain address with the flow.

28. A method of performing network address translation, the method comprising:
performing a deep packet inspection (DPI) of a traffic packet having an external domain address of a network address translation (NAT) device, the external domain address being associated with a pending or a previously established flow having a corresponding destination address, the flow being a communication between an external domain and an internal domain; and
based on a result of the DPI, associating the external domain address and the destination address with the flow, wherein performing the DPI includes performing the DPI at one or more of an application layer, a transport layer, an Internet layer, or a network access layer of a TCP/IP stack.

29. The method according to claim 28 wherein performing the DPI identifies the destination address of the flow from within a payload of the traffic packet, the payload beginning after transport information in a header of the traffic packet.

30. A method of performing network address translation, the method comprising:
performing a deep packet inspection (DPI) of a traffic packet having an external domain address of a network address translation (NAT) device, the external domain address being associated with a pending or a previously established flow having a corresponding destination address, the flow being a communication between an external domain and an internal domain; and
based on a result of the DPI, associating the external domain address and the destination address with the flow, wherein performing the DPI includes locating a destination host name in a payload of the traffic packet using application-specific information to parse the traffic packet.

31. The method according to claim 30 wherein performing the DPI further includes inspecting application payload of the traffic packet.

32. A method of performing network address translation, the method comprising:
performing a deep packet inspection (DPI) of a traffic packet having an external domain address of a network address translation (NAT) device, the external domain address being associated with a pending or a previously established flow having a corresponding destination address, the flow being a communication between an external domain and an internal domain; and
based on a result of the DPI, associating the external domain address and the destination address with the flow, the flow maintaining at least four parameters: for a packet arriving at the NAT device, a source address being an address of a device in the external domain and a destination address being a NAT address on an external side of the NAT device, and for a packet being transmitted from the NAT device, a source address being the NAT address on the external side of the NAT device and a destination address being an address of a device in the internal domain.

33. A method of performing network address translation, the method comprising:
performing a deep packet inspection (DPI) of a traffic packet having an external domain address of a network address translation (NAT) device, the external domain address being associated with a pending or a previously established flow having a corresponding destination address, the flow being a communication between an external domain and an internal domain;
based on a result of the DPI, associating the external domain address and the destination address with the flow;
maintaining the external domain address in a pending state following receipt from another network node that the external domain address was given to an external node; and
changing the pending state to an established state following receipt of traffic corresponding to the external domain address.

34. An apparatus for performing network address translation, the apparatus comprising:
a deep packet inspection (DPI) module configured to perform deep packet inspection of a traffic packet having an external domain address of a network address translation (NAT) device, the external domain address being associated with a pending or a previously established flow having a corresponding destination address, the flow being a communication between an internal domain and an external domain, the DPI module further configured to perform DPI at an application layer, a transport layer, an Internet layer, or a network access layer of a TCP/IP stack; and
a traffic association module configured to associate the external domain address and the destination address with the flow based on a result of the DPI.

35. The apparatus according to claim 34 wherein the DPI module is further configured to identify the destination address of the flow from within a payload of the traffic packet, where the payload begins after transportation information in a header of the traffic packet.

36. An apparatus for performing network address translation, the apparatus comprising:
a deep packet inspection (DPI) module configured to perform deep packet inspection of a traffic packet having an external domain address of a network address translation (NAT) device, the external domain address being associated with a pending or a previously established flow having a corresponding destination address, the flow being a communication between an internal domain and an external domain, the DPI module further configured to locate a destination host name in a payload of the traffic packet by using application-specific information to parse the traffic packet; and
a traffic association module configured to associate the external domain address and the destination address with the flow based on a result of the DPI.

37. The apparatus according to claim 36 wherein the DPI module is further configured to inspect application payload of the traffic packet.

38. An apparatus for performing network address translation, the apparatus comprising:
a deep packet inspection (DPI) module configured to perform deep packet inspection of a traffic packet having an external domain address of a network address translation (NAT) device, the external domain address being associated with a pending or a previously established flow having a corresponding destination address, the flow being a communication between an internal domain and an external domain, the flow maintaining at least four parameters: for a packet arriving at the NAT device, a source address being an address of a device in the external domain and a destination address being a NAT address on an external side of the NAT device, and for a packet being transmitted from the NAT device, a source address being the NAT address on the external side of the NAT device and a destination address being an address of a device in the internal domain; and a traffic association module configured to associate the external domain address and the destination address with the flow based on a result of the DPI.

39. An apparatus for performing network address translation, the apparatus comprising:

a deep packet inspection (DPI) module configured to perform deep packet inspection of a traffic packet having an external domain address of a network address translation (NAT) device, the external domain address being associated with a pending or a previously established flow having a corresponding destination address, the flow being a communication between an internal domain and an external domain;

a traffic association module configured to associate the external domain address and the destination address with the flow based on a result of the DPI; and an address state tracking module configured to:
  maintain the external domain address in a pending state following receipt from another network node that the external domain address was given to an external node; and
  change the pending state to an established state following receipt of traffic corresponding to the external domain address.

* * * * *